United States Patent [19]
Li

[11] Patent Number: 6,094,666
[45] Date of Patent: Jul. 25, 2000

[54] CHINESE CHARACTER INPUT SCHEME HAVING TEN SYMBOL GROUPINGS OF CHINESE CHARACTERS IN A RECUMBENT OR UPRIGHT CONFIGURATION

[76] Inventor: Peng T. Li, 2980 Consear Rd., Lambertville, Mich. 48144

[21] Appl. No.: 09/099,411

[22] Filed: Jun. 18, 1998

[51] Int. Cl.[7] .............................. G06F 17/28; G06F 17/21
[52] U.S. Cl. ............................... 707/535; 704/8; 400/110; 345/171
[58] Field of Search ..................... 704/1, 8, 10; 707/534, 707/535, 536; 400/109, 110, 484; 434/156, 157, 159, 160, 167, 169; 345/171; 382/185; 341/28

[56] References Cited

U.S. PATENT DOCUMENTS

| | | | |
|---|---|---|---|
| 3,929,216 | 12/1975 | Einbinder | 400/484 |
| 3,936,664 | 2/1976 | Sato | 345/17 |
| 3,950,734 | 4/1976 | Li | 707/535 |
| 4,079,482 | 3/1978 | Yeh | 400/104 |
| 4,096,934 | 6/1978 | Kirmser et al. | 400/110 |
| 4,122,533 | 10/1978 | Kubinak | 707/535 |
| 4,144,405 | 3/1979 | Wakamatsu | 178/30 |
| 4,163,229 | 7/1979 | Bodin et al. | 345/20 |
| 4,173,753 | 11/1979 | Chou | 382/185 |
| 4,181,973 | 1/1980 | Tseng | 345/142 |
| 4,193,119 | 3/1980 | Arase et al. | 704/2 |
| 4,228,507 | 10/1980 | Leban | 707/535 |
| 4,251,871 | 2/1981 | Yu | 345/142 |
| 4,270,022 | 5/1981 | Loh | 178/30 |
| 4,286,329 | 8/1981 | Goertzel et al. | 345/467 |
| 4,294,550 | 10/1981 | Wang | 400/110 |
| 4,327,421 | 4/1982 | Wang | 707/535 |
| 4,379,288 | 4/1983 | Leung et al. | 341/28 |
| 4,408,199 | 10/1983 | White et al. | 345/129 |
| 4,462,703 | 7/1984 | Lee | 400/110 |
| 4,498,143 | 2/1985 | Strzelecki | 707/535 |
| 4,543,631 | 9/1985 | Kurosu et al. | 707/535 |
| 4,559,615 | 12/1985 | Goo et al. | 707/535 |
| 4,669,901 | 6/1987 | Feng | 400/484 |
| 4,868,779 | 9/1989 | Seto | 707/536 |
| 4,868,913 | 9/1989 | Tse-Kai | 345/171 |
| 4,879,653 | 11/1989 | Shinoto | 707/535 |
| 4,920,492 | 4/1990 | Wang | 707/535 |

(List continued on next page.)

FOREIGN PATENT DOCUMENTS

| | | |
|---|---|---|
| 563390 | 10/1993 | European Pat. Off. . |
| 58-168135 | 10/1983 | Japan . |
| 58-43431 | 3/1984 | Japan . |
| 2030335 | 4/1980 | United Kingdom . |
| 2057973 | 4/1981 | United Kingdom . |
| 2125197 | 2/1984 | United Kingdom . |
| 2158626 | 11/1985 | United Kingdom . |
| 2239542 | 7/1991 | United Kingdom . |

*Primary Examiner*—Joseph Thomas
*Attorney, Agent, or Firm*—Richard C. Litman

[57] ABSTRACT

A Chinese character input scheme groups and arranges Chinese symbols into ten symbol groupings. The first symbol grouping includes symbols which have a stroke from left to right or left to right up, the second symbol grouping includes symbols which have two adjacent strokes which are parallel, which merge, or which diverge, the third symbol grouping includes symbols which have three adjacent strokes which are parallel, which merge, or which diverge, the fourth symbol grouping includes symbols which have a closed square, a small square, a square within a square occupying four code areas, or an outer square which depicts two more codes within, depending on whether the symbol is recumbent or upright, the fifth symbol grouping includes symbols comprising a vertical slant toward the left, the sixth symbol grouping includes a symbol which is a single cross in a vertical plane, the seventh symbol grouping includes a symbol that is a double cross in a vertical plane, the eighth symbol grouping includes symbols which have a corner or a zigzag of two subsequent continuous flow strokes, the ninth symbol grouping includes symbols comprising a dot with a slant upwards and towards the left, and the tenth symbol grouping includes a symbol that is a straight line with one dot on the top. Each Chinese character is identified with symbols selected from the group of ten symbol groupings.

12 Claims, 3 Drawing Sheets

U.S. PATENT DOCUMENTS

| | | | |
|---|---|---|---|
| 4,937,745 | 6/1990 | Carmon | 707/535 |
| 4,949,260 | 8/1990 | Hsu | 707/535 |
| 4,951,202 | 8/1990 | Yan | 707/535 |
| 5,119,296 | 6/1992 | Zheng et al. | 707/535 |
| 5,131,766 | 7/1992 | Wong | 400/110 |
| 5,187,480 | 2/1993 | Thomas et al. | 341/22 |
| 5,197,810 | 3/1993 | Zhang et al. | 400/110 |
| 5,307,267 | 4/1994 | Yang | 707/535 |
| 5,319,552 | 6/1994 | Zhong | 707/535 |
| 5,378,068 | 1/1995 | Hua | 400/110 |
| 5,634,066 | 5/1997 | Takehara et al. | 707/535 |
| 5,713,033 | 1/1998 | Sado | 707/534- |

Fig.1

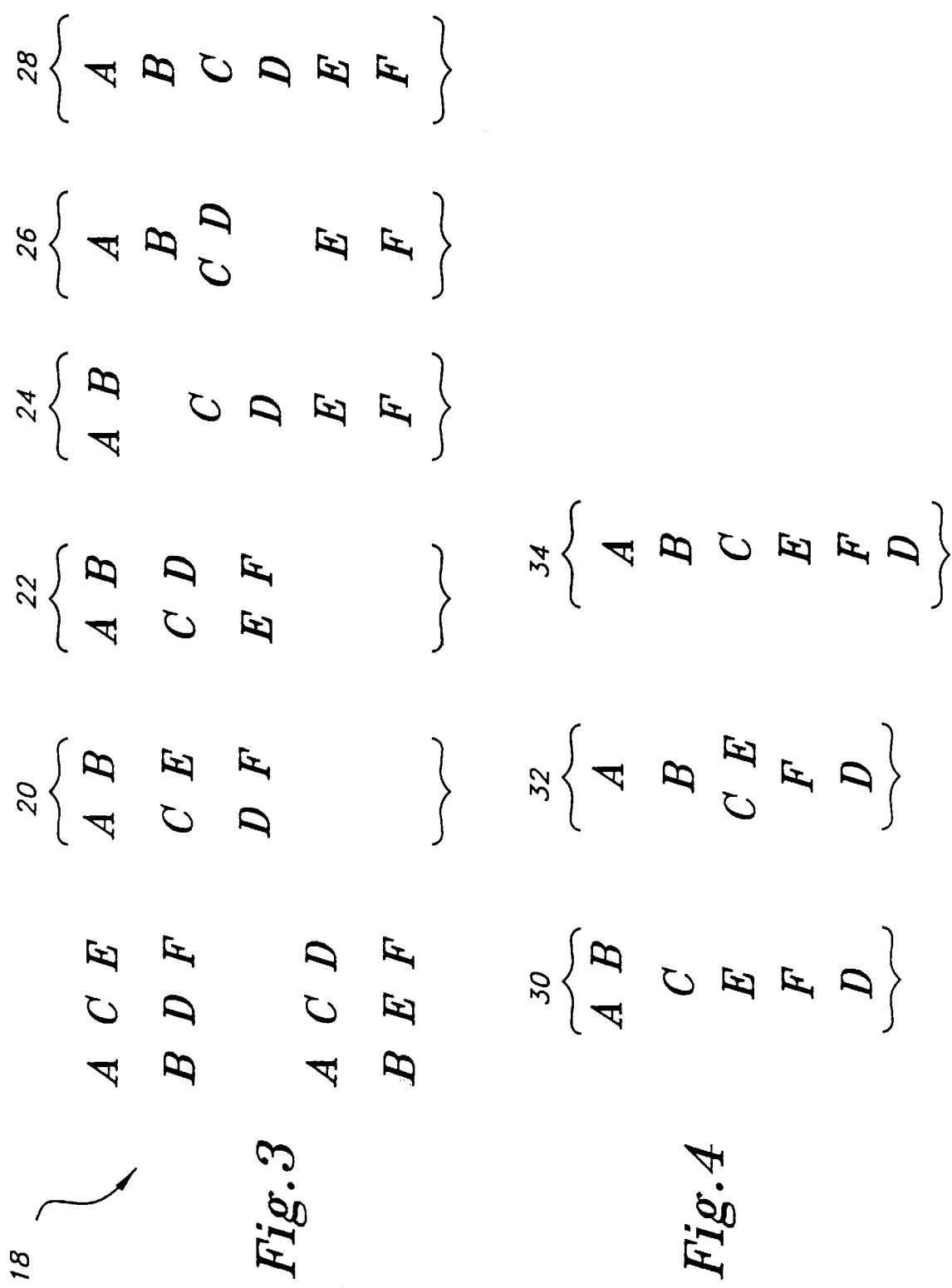

CHINESE CHARACTER INPUT SCHEME HAVING TEN SYMBOL GROUPINGS OF CHINESE CHARACTERS IN A RECUMBENT OR UPRIGHT CONFIGURATION

BACKGROUND OF THE INVENTION

1. Field of the Invention

The present invention relates to a method for efficiently coding Chinese characters so as to alleviate the collision rate to an acceptable minimum.

2. Description of the Related Art

For the last several decades, Chinese computer users have been wrestling with the alphabetic keyboards, trying to squeeze the Chinese characters into the screen with the uneasy newly invented so called Three corners method, Goo coding system, Five strokes method, Changjie's input scheme, etc., trying to retrieve the Chinese characters from the Chinese characters pool, even though there's no problem with the capacity of huge memory storage. However, none of these input methods provides an acceptable, easy to use, standardized input/output scheme to speed up the retrieval, typewriting process, by taking full advantages of the computer technology. While these input methods have been put to decent practical use, a need still remains for improving the known encodation systems. So far, the numeric type of coding would seem to meet the requirement. Eventually, the encodation instantly becomes the index of Chinese characters, and their literatures. Chinese characters are pictographic, ideographic, hieroglyphic, etc. Chinese character strokes and symbols are so different and so complicated that they can be sorted and grouped in a wide variety of ways. One can analytically sort out as many as 35–40 strokes of 4–10 symbols or more per Chinese character, depending upon how they are grouped.

The related art is represented by the following patents of interest.

U.S. Pat. No. 3,936,664, issued on Feb. 3, 1976 to Hiroshi Sato, describes an apparatus for generating a character pattern. U.S. Pat. No. 3,950,734, issued on Apr. 13, 1976 to Tzu-Hung Li, describes a simplified keyboard on which Chinese characters are represented in accordance with a system for classifying the structure of each character providing a hundred prefix and suffix combinations in rows and columns identified respectively with indexing codes, permitting any Chinese character to be indicated two keystrokes on the input keyboard. U.S. Pat. No. 4,079,482, issued on Mar. 21, 1978 to Chan H. Yeh, describes a system for encoding binary information for the electronic data processing of complex characters and in particular Chinese characters. U.S. Pat. No. 4,096,934, issued on Jun. 27, 1978 to Philip George Kirmser et al., describes a typewriter for reproducing desired Chinese ideographs. U.S. Pat. No. 4,122,533, issued on Oct. 24, 1978 to Ronald Arthur Kubinak, describes a photocomposition machine with a versatile control for displaying symbols of any one of several selectable languages, yet without duplicating the character generators and associated memory for each language. U.S. Pat. No. 4,144,405, issued on Mar. 13, 1979 to Shuichi Wakamatsu, describes a Kanji-character writing device. U.S. Pat. No. 4,163,229, issued on Jul. 31, 1979 to Leslie J. Brodin, describes a display system which displays symbols formed by assembling rows of indicia. U.S. Pat. No. 4,173,753, issued on Nov. 6, 1979 to Hsu Ching Chou, describes a method of entering Chinese characters into an input system of a Sino-Computer. U.S. Pat. No. 4,181,973, issued on Jan. 1, 1980 to Samuel C. Tseng, describes a character generator which reconstructs an original character image from compacted data representing the original character. U.S. Pat. No. 4,193,119, issued on Mar. 11, 1980 to Shingo Arase et al., describes an apparatus for assembling material for a printed text which maintains a display of the text material as it is developed and which concurrently displays character forms from which further text characters may be sequentially selected. U.S. Pat. No. 4,228,507, issued on Oct. 14, 1980 to Carl Leban, describes a method of transcribing non-alphabetic characters by entering into a computer one of a given finite plurality of symbols defining one of the elements in the character, successively entering into the computer given finite pluralities of symbols defining other elements in the character, and entering with the given finite plurality of symbols defining other elements in the character predetermined ones of a finite plurality of symbols defining the position of the other elements relative to the element defined by the previous symbol. U.S. Pat. No. 4,251,871, issued on Feb. 17, 1981 to Wellington C. Yu, describes a machine implementable method for reconstructing Chinese-like whole characters in a designated alphabet. U.S. Pat. No. 4,270,022, issued on May 26, 1981 to Shiu C. Loh, describes a character selection keyboard for use in connection with an ideographic language of which the characters can each comprise one or more of a set of character components. U.S. Pat. No. 4,286,329, issued on Aug. 25, 1981 to Gerald Goertzel et al., describes a complex character generator for characters such as Kanji characters, Hebrew character, Arabic characters or the like. U.S. Pat. No. 4,294,550, issued on Oct. 13, 1981 to An Wang, describes a typewriter for ideographic characters, U.S. Pat. No. 4,327,421, issued on Apr. 27, 1982 to Gary Y. Wang, describes a method and apparatus for printing Chinese or other ideographic characters. U.S. Pat. No. 4,379,288, issued on Apr. 5, 1983 to Daniel L. Leung et al., describes a word processing system for Chinese type characters. U.S. Pat. No. 4,408,199, issued on Oct. 4, 1983 to Douglass A. White et al., describes the generation of a character set such as the Oriental character set from a forty-four key keyboard utilizing standardized coded signals for input. U.S. Pat. No. 4,462,703, issued on Jul. 31, 1984 to Hsing C. Lee, describes a method and apparatus for controlling and ordering Chinese characters wherein a Chinese character is formed from a set of form-strokes and the strokes which from the characters are divided into four basic stroke subsets. U.S. Pat. No. 4,498,143, issued on Feb. 5, 1985 to Stanislaus Strzelecki, describes a method and apparatus for forming ideograms (or ideographic characters) including Chinese and Japanese Kanji, with associated alphabetic symbols for Roman, Hiragana, Chinese BoPoMoFo, Korean Hankul and the like. U.S. Pat. No. 4,543,631, issued on Sep. 24, 1985 to Masaaki Kurosu et al., describes a Japanese text inputting system having an interactive mnemonic mode and a display choice mode. U.S. Pat. No. 4,559,615, issued on Dec. 17, 1985 to Atkin Y. Goo et al., describes a complex character generator. U.S. Pat. No. 4,868,779, issued on Sep. 19, 1989 to Tetsuo Seto, describes a character code generating device. U.S. Pat. No. 4,868,913, issued on Sep. 19, 1989 to Ann Tse-Kai, describes a system of encoding Chinese characters according to their patterns. U.S. Pat. No. 4,879,653, issued on Nov. 7, 1989 to Yoshinori Shinoto, describes a system for selecting a desired ideographic character or at least one word including at least one ideographic character from a plurality of ideographic characters each of which have an ideographic configuration containing hieroglyphic elements, such as Chinese characters. U.S. Pat. No. 4,937,745, issued on Jun. 26, 1990 to Amiram Carmon, describes a method and apparatus for selecting and storing script characters, particularly Chinese, in a computerized system containing a memory wherein is stored a database of such script characters. U.S. Pat. No. 4,920,492, issued on Apr. 24, 1990 to Jeff Wang, describes a method of inputting Chinese characters into computers and the keyboard arrangement thereof. U.S. Pat. No. 4,949,260, issued on Aug. 14, 1990 to Su-Hsia Hsu, describes a method for inputting information in Chinese through a hieroglyphic approach. U.S. Pat. No. 4,951,202, issued on Aug. 21, 1990 to Miin J. Yan, describes an oriental language processing system. U.S. Pat. No. 5,119,296, issued on Jun. 2, 1992 to Yili Zheng et al., describes a computer-encoding method for Chinese characters and a corresponding information processing apparatus. U.S. Pat. No. 5,131,766, issued on Jul. 21, 1992 to Kam-Fu Wong, describes a method for encoding Chinese characters into a computer. U.S. Pat. No. 5,187,480, issued on Feb. 16, 1993 to Ronald H. Thomas et al. describes a method and apparatus for assembling text in ideographic language characters. U.S. Pat. No. 5,197,810, issued on Mar. 30, 1993 to Daozheng Zhang et al., describes a method and apparatus for inputting both simplified form and original complex form Chinese characters. U.S. Pat. No. 5,307,267, issued on Apr. 26, 1994 to Gong M. Yang, describes a keyboard input device for a user to input a plurality of characters and symbols. U.S. Pat. No. 5,319,552, issued on Jun. 7, 1994 to Xingguo Zhong, describes a method and apparatus for converting a representation of a pronunciation by means of phonetic symbols of Chinese inputted from a keyboard or the like into a corresponding Chinese character to output the same. U.S. Pat. No. 5,378,068, issued on Jan. 3, 1995 to Teyh-Fwu Hua, describes a word processor for generating Chinese characters. U.S. Pat. No. 5,634,066, issued on May 27, 1997 to Mitsuru Takehara et al., describes an information processing apparatus by which characters can be inputted easily. U.S. Pat. No. 5,713,033, issued on Jan. 27, 1998 to Ichiro Sado, describes electronic equipment capable of converting or translating a first language to a second language or vice versa, such as a KANA-to-KANJI conversion. Great Britain Patent document 2,030,335, published on Apr. 2, 1980, describes a character selection keyboard for use in connection with an ideographic language of which characters can each comprise one or more of a set of character components. Great Britain Patent document 2,057,973, published on Apr. 8, 1981, describes an input system for a Sino-Computer. Great Britain Patent document 2,125,197, published on Feb. 29, 1984, describes a method of encoding Chinese characters. Great Britain Patent document 2,158,626, published on Nov. 13, 1985, describes a universal system for encoding Chinese characters and a kind of keyboard designed on the basis of the system. Great Britain Patent document 2,239,542, published on Jul. 3, 1991, describes a holographic code for Chinese characters. European Patent document 563,390, published on Oct. 6, 1993, describes a personal computer message displaying method. Japan Patent document 58-168135, published on Oct. 4, 1983, describes a keyboard device. Japan Patent document 59-43431, published on Mar. 19, 1984, describes a method for inputting Chinese characters.

None of the above inventions and patents, taken either singularly or in combination, is seen to describe the instant invention as claimed.

SUMMARY OF THE INVENTION

The present invention groups and arranges Chinese symbols into ten symbol groupings including a first, a second, a third, a fourth, a fifth, a sixth, a seventh, an eighth, a ninth, and a tenth symbol grouping. The first symbol grouping includes symbols which have a stroke from left to right or left to right up. The second symbol grouping includes symbols comprising two adjacent strokes which are parallel, which merge, or which diverge. The third symbol grouping includes symbols which have three adjacent strokes which are parallel, which merge, or which diverge. The fourth symbol grouping includes symbols which have a closed square, a small square, a square within a square occupying four code areas, or an outer square which depicts two more codes within, depending on whether the symbol is recumbent or upright. The fifth symbol grouping includes symbols which have a vertical slant toward the left. The sixth symbol grouping includes a symbol which is a single cross in a vertical plane. The seventh symbol grouping includes a symbol which is a double cross in a vertical plane. The eighth symbol grouping includes symbols which have a corner or a zigzag of two subsequent continuous flow strokes. The ninth symbol grouping includes symbols which have a dot with a slant upwards and towards the left. The tenth symbol grouping includes a symbol which is a straight line with one dot on the top.

With these symbols, the Chinese characters can be analyzed word by word according to the traditional sequences of the strokes. Each character has a sequential priority which is fairly easy to figure out based on the stream of movement of the right hand, wrist, and the fingers. With these symbols and a sequence of encodation, an average Chinese character has 10–25 symbols per character, which is a burden for the typewriters, typesetters, as well as the Chinese public. To overcome the inherent problems of categorizing Chinese characters, the present invention depicts only six symbols per character.

The Chinese characters can be either recumbent or upright. Recumbent characters are generally configured from left to right and may include some symbols configured from top to bottom. Upright characters are generally configured from top to bottom. handwritings start from far top left to left bottom. The present invention employs a coding scheme whereby each Chinese character is characterized by six of the ten symbol groupings.

The inventive method of coding Chinese characters includes the step of identifying each Chinese character with symbols selected from the ten symbol groupings in a recumbent or upright configuration. The symbols are depicted by the priority of left to right and then top to bottom, as well as plane by plane. The step of identifying each Chinese character includes the step of selecting first, second, third, fourth, fifth, and sixth symbols from the group of ten symbol groupings in a recumbent or upright configuration to provide six symbol uniformity in Chinese character identification. However, Chinese characters may obviously be represented by more than six symbols to more accurately depict any particular Chinese character. Undesignated symbols between selected first and second symbols, selected third and fourth symbols, and selected fifth and sixth symbols of a Chinese character with more than six symbols are ignored and one or more zeros are applied for Chinese characters that have less than six symbols to maintain the six symbol uniformity.

The method of coding Chinese characters further comprises the step of depicting symbols for recumbent character configurations by the priority of depicting the left uppermost and left lowest of the furthest plane on the left for the first and second symbols, and depicting the furthest left the highest if the first symbol position has more than two symbols in one plane and depicting the lowest symbols or the furthest left of the lowest plane for the second symbol. The method of coding Chinese characters further comprises the step of depicting for recumbent character configurations the third and fourth symbols by the priority of left uppermost and left lowest of a vertical plane adjacent to and on the right of the vertical plane containing the first and second symbols. The method of coding Chinese characters further comprises the step of depicting for recumbent character configurations the fifth symbol from the right uppermost symbol and the sixth symbol from the lowest symbol of the furthest right.

The method of coding Chinese characters further comprises the step of depicting symbols for upright character configurations having an upper horizontal plane by the priority of selecting the first symbol as the center symbol and selecting the second symbol as a zero for a horizontal plane with an odd number of three or more symbols, and selecting the outermost symbols as the first symbol and the second symbol for a horizontal plane with an even number of four or more symbols, wherein the next plane contains the third and the fourth symbols. The method of coding Chinese characters further comprises the step of depicting for upright character configurations the fourth and fifth symbols as the symbols immediately next to the respectively determined first and second symbols. The method of coding Chinese characters further comprises the step of depicting for upright character configurations the fifth symbol as the lowest symbol below the selected third symbol and depicting the sixth symbol as the adjacent symbol next to the selected fifth symbol.

The method of coding Chinese characters further comprises the step of depicting a Chinese character flanked by two symmetrical symbols or groups of symbols, pictographic or ideographic, by depicting the first and second symbols as the symmetrical symbols, and depicting the, third, fourth, fifth, and sixth symbols as the symbols appearing between the symmetrical symbols. The method of coding Chinese characters further comprises the step of depicting the symbols by a symmetrical priority rule, wherein contents flanked by symmetrical symbols have priority.

Accordingly, it is a principal object of the invention to provide a Chinese character computer input scheme which groups and arranges Chinese symbols into ten symbol groupings.

It is another object of the invention to provide a Chinese character computer input scheme which encodes each Chinese character with six symbols out of the ten symbol groupings.

It is an object of the invention to provide improved elements and arrangements thereof in a Chinese character computer input scheme for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 1 is diagram of the group of ten symbols employed in the present invention.

FIG. 3 is a diagram showing the coding configuration of the present invention.

FIG. 4 is a diagram showing a modified coding configuration of the present invention.

Similar reference characters denote corresponding features consistently throughout the attached drawings.

DETAILED DESCRIPTION OF THE PREFERRED EMBODIMENTS

Figure 1:
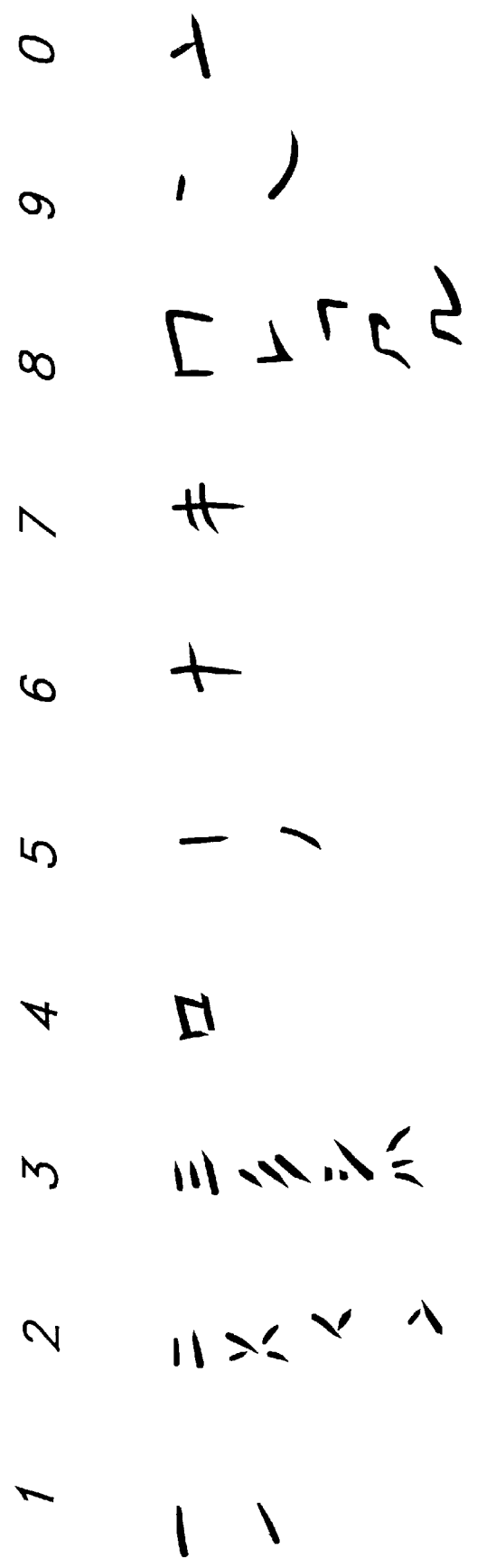
Figure 2:
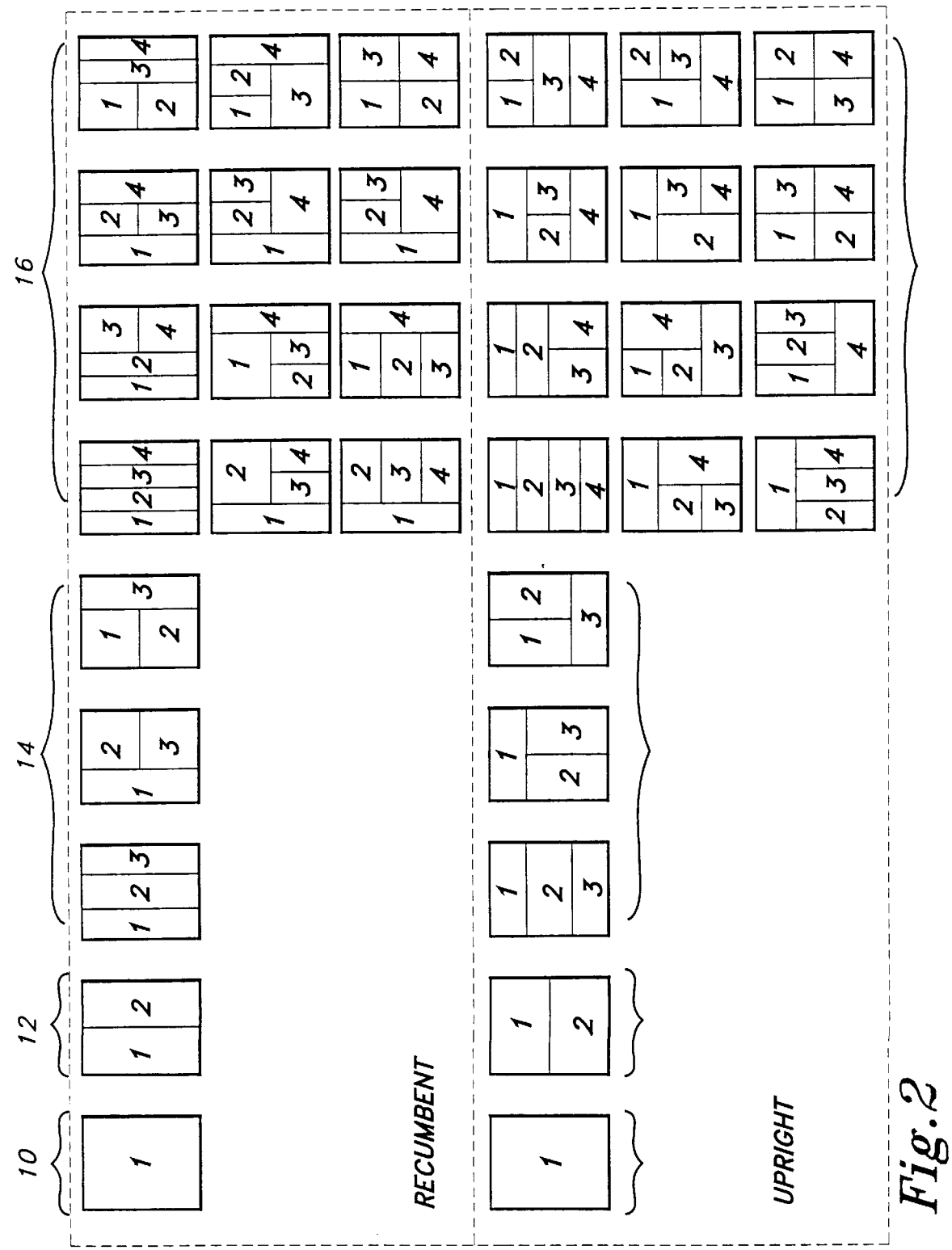
FIG. 2 is a diagram showing how Chinese characters are constructed in either a recumbent or upright configuration.

The present invention groups and arranges Chinese symbols into ten symbol groupings, as shown in FIG. 1. The first symbol grouping includes symbols which have a stroke from left to right or left to right up. The second symbol grouping includes symbols which have two adjacent strokes which are parallel, which merge, or which diverge. The third symbol grouping includes symbols which have three adjacent strokes which are parallel, which merge, or which diverge. The fourth symbol grouping includes symbols which have a closed square, a small square, a square within a square occupying four code areas, or an outer square which depicts two more codes within, depending on whether the symbol is recumbent or upright. The fifth symbol grouping includes symbols which have a vertical slant toward the left. The sixth symbol grouping includes a symbol which is a single cross in a vertical plane. The seventh symbol grouping includes a symbol which is a double cross in a vertical plane. The eighth symbol grouping includes symbols which have a corner or a zigzag of two subsequent continuous flow strokes. The ninth symbol grouping includes symbols which have a dot with a slant upwards and towards the left. The tenth symbol grouping includes a symbol which is a straight line with one dot on the top.

With these symbols, the Chinese characters can be analyzed word by word according to the traditional sequences of the strokes. Each character has a sequential priority which is fairly easy to figure out based on the stream of movement of the right hand, wrist, and the fingers. With these symbols and a sequence of encodation, an average Chinese character has 10–25 symbols per character, which is a burden for the typewriters, typesetters, as well as the Chinese public. To overcome the inherent problems of categorizing Chinese characters, the present invention depicts only six symbols per character.

The Chinese characters can be either recumbent or upright, as illustratively shown in FIG. 2. Recumbent characters are generally configured from left to right and may include some symbols configured from top to bottom. Upright characters are generally configured from top to bottom. For purposes of description, the Chinese character configurations shown in FIG. 2 will be referred to as comprising one or more symbol "planes" which are represented by the numbers 1–4. These planes will be referred to as either a vertical plane or a horizontal plane. Each plane generally contains one or more symbols. For example, recumbent characters generally include one or more vertical planes and upright characters generally include one or more horizontal planes. Reference numeral 12 refers to a recumbent character with two vertical planes adjacent to each other or an upright character with two horizontal planes aligned on one another. Reference numeral 14 includes recumbent and upright character configurations having vertical planes, horizontal planes, and combinations thereof. FIG. 2 is limited to showing recumbent and upright character configurations having four symbol planes at most. However, it should be understood that the number of symbol planes in a character may be greater than four.

Handwritings generally start from far top left to left bottom. The present invention employs a coding scheme whereby each Chinese character may be characterized by six symbols selected from the ten symbol groupings shown in FIG. 1. The manner in which the inventive coding occurs is shown in FIGS. 3 and 4. The letters A, B, C, D, E, and F each represent one symbol from selected from the ten symbol groupings shown in FIG. 1. Recumbent character configurations are represented by reference numeral 18 in FIG. 3. Upright character configurations are represented by reference numerals 20,22,24,26 and 28 in FIG. 3. The last three upright character configurations 24,26, and 28 may be modified in the form shown in FIG. 4 for reference numerals 30,32,34. To maintain the consistency of six symbols for each character, a zero is supplied for characters that require fewer than six symbols. For each Chinese character six symbols are selected from the ten symbol groupings shown in FIG. 1.

The coding scheme is defined with the following rules:

(1) On a horizontal plane, not a vertical plane, contents of symmetricals, pictographic and ideographic alike, have the priority of the rule of symmetrical symbols.

(2) Symbols within or between symmetricals, pictographic and ideographic alike, are featured as one unit which follows the top down or upward natural sequential priority to depict the center parts or the contents of the symmetricals as their priority.

(3) On a horizontal plane with three asymmetrical symbols, the far left or far right symbols are depicted, except for the AB level, the center symbol is depicted for A, a zero is depicted for B and CE is moved up to depict each side of the flanks.

(4) Characters that are flanked by two symmetrical symbols depict the symbols within and between the flanks C,D,E,F and the left flank designated for AB.

(5) For recumbent characters, B is depicted B with the rule of thumb to the far left except for the priority rules mentioned.

The inventive method of coding Chinese characters includes the step of identifying each Chinese character with symbols selected from the ten symbol groupings shown in FIG. 1 in a recumbent or upright configuration. The symbols are depicted by the priority of left to right and then top to bottom, as well as plane by plane. The step of identifying each Chinese character includes the step of selecting first, second, third, fourth, fifth, and sixth symbols from the group of ten symbol groupings in a recumbent or upright configuration to provide six symbol uniformity in Chinese character identification. However, Chinese characters may obviously be represented by more than six symbols to more accurately depict any particular Chinese character. Undesignated symbols between selected first and second symbols, selected third and fourth symbols, and selected fifth and sixth symbols of a Chinese character with more than six symbols are ignored and one or more zeros are applied for Chinese characters that have less than six symbols to maintain the six symbol uniformity.

The method of coding Chinese characters further comprises the step of depicting symbols for recumbent character configurations by the priority of depicting the left uppermost and left lowest of the furthest plane on the left for recumbent first and second symbols, and depicting the furthest left the highest if the first symbol position has more than two symbols in one plane and depicting the lowest symbols or the furthest left of the lowest plane for the second symbol. The method of coding Chinese characters further comprises the step of depicting for recumbent character configurations the third and fourth symbols by the priority of left uppermost and left lowest of a vertical plane adjacent to and on the right of the vertical plane containing the first and second symbols.

The method of coding Chinese characters further comprises the step of depicting for recumbent character configurations the fifth symbol from the right uppermost symbol and the sixth symbol from the lowest symbol of the furthest right.

The method of coding Chinese characters further comprises the step of depicting symbols for upright character configurations having an upper horizontal plane by the priority of selecting the first symbol as the center symbol and selecting the second symbol as a zero for a horizontal plane with an odd number of three or more symbols, and selecting the outermost symbols as the first symbol and the second symbol for a horizontal plane with an even number of four or more symbols, wherein the next plane contains the third and the fourth symbols. The method of coding Chinese characters further comprises the step of depicting for upright character configurations the third and fourth symbols as the symbols immediately next to the respectively determined first and second symbols. The method of coding Chinese characters further comprises the step of depicting for upright character configurations the fifth symbol as the next symbol below the selected third symbol and depicting the sixth symbol as the adjacent symbol next to the selected fourth symbol.

The method of coding Chinese characters further comprises the step of depicting a Chinese character flanked by two symmetrical symbols or groups of symbols, pictographic or ideographic, by depicting the first and second symbols as the symmetrical symbols, and depicting the, third, fourth, fifth, and sixth symbols as the symbols appearing between the symmetrical symbols. The method of coding Chinese characters further comprises the step of depicting the symbols by a symmetrical priority rule, wherein contents flanked by symmetrical symbols have priority.

This invention provides a set of a series of numeric symbols which is easy to remember. It is the real individual symbols and not the symbol of the corners or the individual strokes alone. It is well designed with thorough consideration of the effects on balancing the distributions of the characters in the characters pool in a six digits range, to eliminate the collision rate to the minimum. With the advantage of the simple, easy to remember symbols and without the ambiguity of depicting the corners, the invention provides full scale encodation of a whole Chinese character besides the modified, six digits coding method above to serve as a second set of internal codes for someone who does not know any Chinese character totally, or someone who is still in doubt of his newly learned encodation scheme. The invention provides consistent six digit coding with minimal degeneracies or estimated collision rates of less than ten percent. With this six digit Chinese character retrieval scheme, without a spacestroke, one can practically save one stroke on each character. In other words, the speed of typewriting is very competitive to western typewriters by just 0.3 stroke based on the statistic of 4.7 strokes average for english words.

It is to be understood that the present invention is not limited to the embodiments described above, but encompasses any and all embodiments within the scope of the following claims.

I claim:

1. A method of coding Chinese characters for the conveniences of comprising the steps:

arranging Chinese symbols into ten symbol groupings consisting of a first, a second, a third, a fourth, a fifth, a sixth, a seventh, an eighth, a ninth, and a tenth symbol grouping wherein the first symbol grouping includes symbols comprising a stroke from left to right or left to right up, the second symbol grouping includes symbols comprising two adjacent strokes which are parallel, which merge, or which diverge, the third symbol grouping includes three adjacent strokes which are parallel, which merge, or which diverge, the fourth symbol grouping includes symbols comprising a closed square, a small square, a square within a square occupying four code areas, or an outer square which depicts two more codes within, depending on whether the symbol is recumbent or upright, the fifth symbol grouping includes symbols comprising a vertical slant toward the left, the sixth symbol grouping includes a symbol which is a single cross in a vertical plane, the seventh symbol grouping includes a symbol that is a double cross in a vertical plane, the eighth symbol grouping includes symbols comprising a corner or a zigzag of two subsequent continuous flow strokes, the ninth symbol grouping includes symbols comprising a dot with a slant upwards and towards the left, and the tenth symbol grouping includes a symbol that is a straight line with one dot on the top; and identifying each Chinese character with symbols selected from the group of ten symbol groupings in a recumbent or upright configuration.

2. The method of coding Chinese characters according to claim 1, further comprising the step of depicting the symbols by the priority of left to right and then top to bottom, as well as plane by plane.

3. The method of coding Chinese characters according to claim 1, wherein the step of identifying each Chinese character includes the step of selecting first, second, third, fourth, fifth, and sixth symbols from the group of ten symbol groupings in a recumbent or upright configuration to provide six symbol uniformity in Chinese character identification.

4. The method of coding Chinese characters according to claim 3, wherein undesignated symbols between selected first and second symbols, selected third and fourth symbols, and selected fifth and sixth symbols of a Chinese character with more than six symbols are ignored and one or more zeros are applied for Chinese characters that have less than six symbols to maintain the six symbol uniformity.

5. The method of coding Chinese characters according to claim 3, further comprising the step of depicting symbols for recumbent character configurations by the priority of left uppermost and left lowest of the furthest plane on the left for the first and second symbols, and depicting the furthest left the highest if the first symbol position has more than two symbols in one plane and depicting the lowest symbols or the furthest left of the lowest plane for the second symbol.

6. The method of coding Chinese characters according to claim 5, further comprising the step of depicting for recumbent character configurations the third and fourth symbols by the priority of left uppermost and left lowest of a vertical plane adjacent to and on the right of the vertical plane containing the first and second symbols.

7. The method of coding Chinese characters according to claim 5, further comprising the step of depicting symbols for recumbent character configurations by the priority of selecting the fifth symbol from the right uppermost symbol and the sixth symbol from the lowest symbol of the furthest right.

8. The method of coding Chinese characters according to claim 3, further comprising the step of depicting symbols for upright character configurations having an upper horizontal plane by the priority of selecting the first symbol as the center symbol and selecting the second symbol as a zero for a horizontal plane with an odd number of three or more symbols, and selecting the outermost symbols as the first symbol and the second symbol for a horizontal plane with an even number of four or more symbols, wherein the next plane contains the third and the fourth symbols.

9. The method of coding Chinese characters according to claim 8, further comprising the step of depicting symbols for upright character configurations by the priority of selecting the third and fourth symbols as the symbols immediately next to the respectively determined first and second symbols.

10. The method of coding Chinese characters according to claim 8, further comprising the step of depicting symbols fur upright character configurations by the priority of selecting the fifth symbol as the lowest symbol below the selected third symbol and depicting the sixth symbol as the adjacent symbol next to the selected fifth symbol.

11. The method of coding Chinese characters according to claim 1, further comprising the step of depicting a Chinese character flanked by two symmetrical symbols or groups of symbols, pictographic or ideographic, by depicting the first and second symbols as the symmetrical symbols, and depicting the third, fourth, fifth, and sixth, symbols as the symbols appearing between the symmetrical symbols.

12. The method of coding Chinese characters according to claim 1, further comprising the step of depicting the symbols by a symmetrical priority rule, wherein contents flanked by symmetrical symbols have priority.

* * * * *